Nov. 26, 1929.                C. B. DE VLIEG                1,737,002
                           ROTATABLE WORK TABLE
                             Filed Oct. 7, 1926
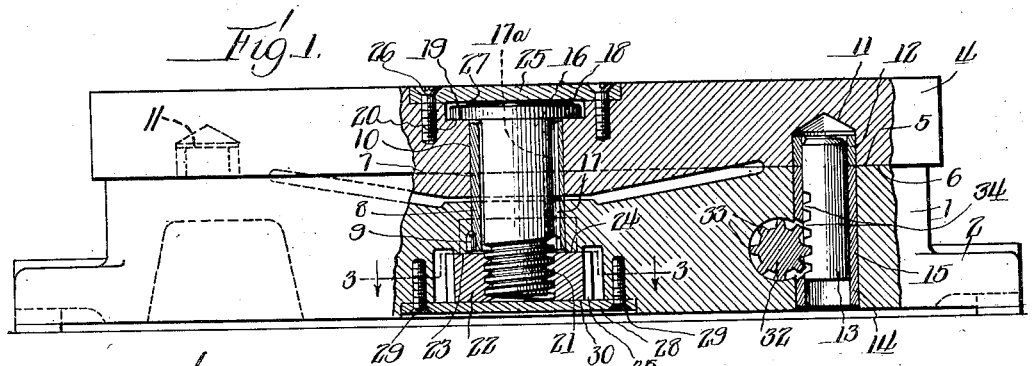
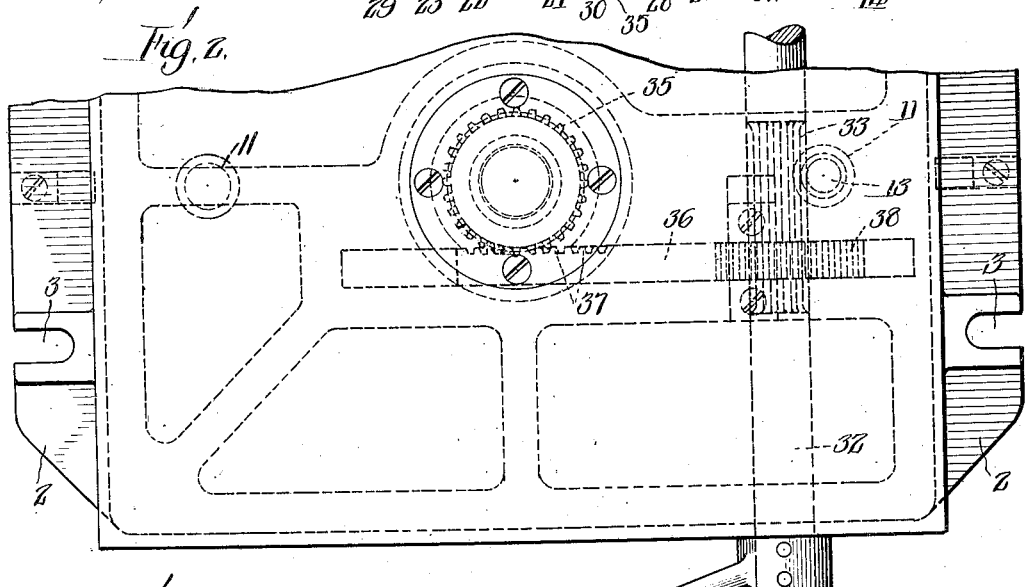
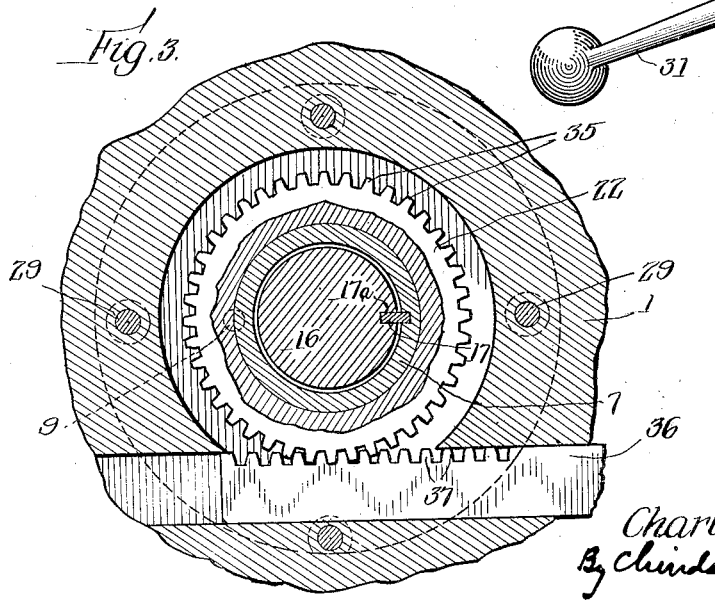
Inventor
Charles B. DeVlieg, Patented Nov. 26, 1929

1,737,002

UNITED STATES PATENT OFFICE

CHARLES B. DE VLIEG, OF ROCKFORD, ILLINOIS, ASSIGNOR TO SUNDSTRAND MACHINE TOOL CO., OF ROCKFORD, ILLINOIS, A CORPORATION OF ILLINOIS

ROTATABLE WORK TABLE

Application filed October 7, 1926. Serial No. 139,969.

The invention relates generally to a rotatable work table, and more particularly to a table adapted to be locked in a plurality of angularly disposed positions.

Work tables of the type contemplated generally comprise a base adapted to be secured to the work carriage of a milling or other type of machine, and a table rotatable upon the base and arranged to be locked to the base in two or more angularly disposed positions. The rotatable table serves as a support on which milling fixtures or holding devices can be mounted. If provided with two locking positions 180° apart, these fixtures can be mounted in pairs so that the milling operation can be performed upon the work held in one fixture while a fixture is loaded or unloaded in the diametrically opposed position, and after the milling operation is completed the table may be rotated so as to transfer the newly loaded fixture to the milling position and the other fixture to the unloading position. This permits of a removal and replenishing of one fixture during a cutting operation on a work-piece held in the other, and provides for practically continuous milling.

It is the general object of the invention to provide a new and improved work table of this character which is of rugged construction and which incorporates efficient means for locking the table relative to its base and for clamping the table to the base so as to prevent vibration and chattering.

It is another object of the invention to provide a rotatable work table with improved means to raise the table from its seat to permit the table to be shifted from one position to another with a minimum amount of effort.

Another object is to provide a new and improved table of this character with locking means and with means to raise the table from its seat simultaneously with the releasing of the locking means.

A further object of the invention is to provide a new and improved rotatable work table with locking means and means to clamp the table to its seat simultaneously with the operation of the locking means.

A further object is to provide a rotatable work table with improved means for raising the table from its seat and clamping the table to its seat, said means being operable by a single control element.

It is a further object of the invention to provide a table rotatably mounted on a base, with means to lock the table in a plurality of angularly disposed positions on the base, means to clamp the table to the base in any of these positions, and means to raise the table from the base when the locking and clamping means are relased, thereby to permit the operator to rotate the table to another position with a minimum amount of effort, all three of which means are adapted to be actuated by a single manually operable element so as to unclamp the table from the base and raise it therefrom as the locking means are withdrawn.

In pursuance of the foregoing objects, I aim to provide a work support comprising a base and a table rotatable thereon, an index device adapted to engage the table to lock the table in various angular positions on the base, and means adapted to raise the table from the base or to clamp it thereto, said last mentioned means being operable simultaneously with the operation of the index device by means including a single operating lever.

Further objects and advantages of the invention will become apparent as the description proceeds.

In the drawings:

Figure 1 is a side elevation partly in central section of the preferred form of the invention.

Fig. 2 is a fragmentary plan view thereof.

Fig. 3 is a section taken along the line 3—3 of Fig. 1.

While I have shown in the drawings and will herein describe in detail the preferred embodiment of the invention, it is to be understood that I do not thereby intend to limit the invention to the specific form disclosed, but aim to cover all modifications and alternative constructions falling within the spirit and scope of the invention as expressed in the appended claims. Although I have disclosed and shall describe a table having but two index positions, it is obvious that any desired number of such positions may be provided.

Referring to the drawings, the invention in the exemplary embodiment illustrated, comprises a base 1 generally rectangular in form, and provided with suitable lugs 2 extending therefrom and having apertures 3 adapted to receive bolts for the purpose of clamping the base onto the work carriage of the machine. A table 4 is rotatable upon the base, a lower annular bearing surface 5 of the table being adapted to slide upon an upper bearing surface or seat 6 on the base. A bearing sleeve 7 is rigidly secured centrally of the base 1 in an aperture 8, as by means of a pin 9. This bearing sleeve extends upwardly through a central bore 10 in the table 4 to provide a pivot for the table. This bore is of a size adapted to afford a snug running fit to insure an accurate positioning of the table upon the seat 6.

The table 4, as illustrated herein, is adapted to be pivoted about the sleeve 7 from one index position to another and to be locked in either of two diametrically opposed positions against further rotational movement.

The means provided to lock the table to the base in these angularly disposed positions is herein illustrated as comprising a pair of sockets 11 in the under side of the table bushed by a pair of sleeves 12. These sockets are positioned 180° apart so as to provide two diametrically opposed locking positions for the table. A single index pin 13 is slidably mounted in a bushing 14 secured in a vertical bore 15 in the base and is adapted to be inserted into either of the sockets 11 to lock the table on the base.

In the form selected for purposes of illustration, the means employed to clamp the table 4 upon the seat 6 of the base comprises a pin or bolt 16 slidable axially in the bearing sleeve 7 and secured against rotation therein by means of a key 17 secured to the inner wall of the sleeve and a keyway 17ª extending longitudinally of the pin. This pin is provided with a circular head 18 integral with the upper end thereof, the under surface 19 of which is adapted to abut an annular shoulder 20 formed in the table. The opposite or lower end of the pin is provided with screw threads 21 which are adapted to be engaged by corresponding threads on a nut 22 rotatably mounted in the base. This nut is confined against axial movement upward by the upper surface 23 of the nut engaging an annular shoulder 24 surrounding the bearing sleeve in the base. Rotation of the nut towards the head 18 will therefore clamp the table 4 to the seat 6.

This pin and nut, in addition to serving as means to clamp the table upon the base upon rotation of the nut on the pin in one direction, is also adapted to raise the table from the base upon rotation of the nut in the opposite direction. To accomplish this the head 18 of the pin is restrained in the table 4 against axial movement relative thereto by means herein illustrated as comprising a circular plate 25 secured in the top of the table and flush with the upper surface thereof, as by means of screws 26. A slight clearance 27 is preferably provided between the lower surface of this plate and the upper surface of the head 18 of the pin. Similarly, the nut 22 is confined in the base against downward axial movement by means of a plate 28 secured to the base by means of screws 29 and positioned with its upper surface 30 to serve as a step bearing for the nut. It will be apparent that upon rotation of the nut in a right hand direction, as mentioned hereinbefore, the pin 16 will be drawn downwardly so that the head 18 thereon will engage the shoulder 20 to clamp the table 4 to the base 1, and that upon rotation of the nut in the opposite direction the table will first be unclamped and as rotation of the nut continues the upper surface of the head 18 will engage the plate 25 to raise the table from the seat 6. The upper surface of the head 18 then serves as a thrust or step bearing for the table, which, having been raised from the seat 6, is adapted to be spun with a minimum amount of effort.

The invention contemplates means to actuate the nut 22 and the index pin 13, including a single manually operable element so as to permit of ready manipulation of the table. As illustrated herein, this operating element comprises a hand lever 31 secured at one end to a rock shaft 32 which is journaled horizontally in the base 1. This rock shaft is provided with pinion teeth 33 thereon which are of substantial width. The teeth 33 are adapted to engage with rack teeth 34 formed upon the index pin 13 so that upon rotation of the shaft 32 the index pin may be actuated into or out of engagement with the sockets 11.

The rock shaft is also adapted to actuate the nut 22. Thus the nut is preferably cylindrical in form and has pinion teeth 35 thereon. A rack bar 36, slidably mounted in the base 1 for movement transversely of the rock shaft 32 and tangentially of the nut 22, is provided with vertical teeth 37 at one end thereof adapted to engage with the teeth 35 on the nut, and has horizontal teeth 38 at the other end thereof adapted to engage with the teeth 33 on the rock shaft. Therefore, when the rock shaft is rotated in a clockwise direction (Fig. 1) to withdraw the index pin 13 from a socket 11, the nut 22 is rotated in a clockwise direction (Fig. 2) to move the pin 16 upwardly. This movement of the pin first unclamps the table 4 from the seat 6 and then raises the table therefrom when the head 18 of the pin engages the plate 25. Similarly, movement of the rock shaft 32 in a counter-clockwise direction to insert the pin 13 in a socket 11 will cause counter-clockwise rotation of the nut 22 (Fig. 2) and lower the pin 16, thereby returning the table 4 to its position on the seat 6 and clamping it thereon.

It will be apparent that by raising the table from its seat prior to rotating it to its other position, the frictional resistance present when the table is rotated upon the seat, is eliminated, and the table, being in engagement only with the bearing sleeve 7 and the step bearing formed by the head of the pin 16, may be spun to its other position with very little effort. The pivot bearing and clamping means for the table are of an extremely rugged construction and are adapted to position the table accurately upon the base and to clamp the table securely thereto to eliminate the possibility of any vibration or chatter such as is present when a table is ineffectively clamped to its seat. The locking means is adapted to be released by a manually operable control element which is also adapted to release the clamping means and which, upon continued movement in the same direction, is adapted to raise the table from its seat, and vice versa. It is obvious that the provision of a single control element for performing these functions permits of ready manipulation of the table when it is desired to shift it from one index position to the other.

I claim as my invention:

1. A rotatable work support comprising, in combination, a base, a table rotatable thereon, a bearing sleeve rigidly secured in said base and extending vertically therefrom into a bore in said table, a bolt slidable axially but not rotatably in said bearing sleeve, said bolt having a head thereon confined in the table to a limited axial movement, a nut mounted in said base for rotational but against axial movement and in screw-threaded engagement with the lower end of said bolt, an index pin slidably mounted in said base, a plurality of sockets in said table adapted to admit said index pin, a rock shaft journaled in said base, and gear connections between said rock shaft and said pin and nut whereby movement of said rock shaft causes simultaneous movement of said pin and nut.

2. In a device of the character described, the combination of a base, a table rotatable thereon, a bearing sleeve rigidly mounted in said base and extending upwardly into a bore in the table to provide a pivot therefor, a pin extending through said sleeve, said pin having a head thereon rotatable in said table and confined to a limited axial movement therein, and an element mounted in said base adapted to be actuated forcibly to lower said pin to clamp the table to the base or to raise said pin relative to said base to lift the table from said base.

3. In a device of the character described, the combination of a base, a table rotatable thereon, a bearing sleeve rigidly mounted in said base and extending upwardly into a bore in the table to provide a pivot therefor, a pin extending through said sleeve, said pin having a head thereon rotatable in said table and confined to a limited axial movement therein, and a nut in screw-threaded engagement with the lower end of said pin, said nut being mounted in said base for rotational and against axial movement.

4. A device of the character described comprising, in combination, a support, a table rotatable thereon, means operable to raise and lower the table relative to the base, an index device operable to lock the table against rotation upon the base, and means adapted positively to actuate said raising and lowering means and said index device simultaneously.

5. A device of the character described comprising, in combination, a base, a table rotatable thereon, a bolt and nut device for clamping the table to the base, one element of which is rotatably mounted in the table and the other rotatably mounted in the base, a control element, and means connecting said control element to the element of said bolt and nut device in the base for rotating the latter element to clamp the table to the base.

6. A device of the character described comprising, in combination, a base, a table rotatable thereon, means operable to clamp the table to the base, said means comprising a bolt and nut device one element of which is rotatably mounted in the table and the other in the base, an index device carried on said base and adapted to engage said table to lock the table against rotational movement, a control element, and means connecting said control element to said index device and to the element of said bolt and nut device in the base.

7. In a device of the character described, the combination of a base, a table rotatable thereon, means operable to lock the table against rotation relative to the base, means to clamp the table to its seat on the base, and means including a portion of said clamping means operable to raise the table from its seat.

8. A device of the character described comprising, in combination, a base, a table rotatable thereon, means operable in one direction to clamp said table to said base and in the opposite direction to release the table from the base, said means upon further actuation in said releasing direction being adapted to raise the table from the base.

9. A device of the character described comprising, in combination, a base, a table rotatable thereon, means operable to lock the table against angular movement, means to clamp the table to the base, means including a portion of said clamping means operable to raise the table from the base, and means including a single control element adapted to operate said locking, clamping and raising means.

10. A device of the character described comprising, in combination, a base, a table rotatable thereon, means comprising a bolt rotatable in said table and a nut rotatable in said base operable to raise the table relative to the base, an index device operable to lock the table against rotation upon the base, and means adapted simultaneously to actuate said nut and said index device.

11. A device of the character described comprising, in combination, a base, a table rotatable thereon, a bolt and nut device one element of which is rotatably mounted in the table and the other in the base, and index device adapted to lock the table against rotational movement, a control element, and means connecting said control element to said index device and to the element of said bolt and nut device in the base.

12. A device of the character described comprising, in combination, a base, a table rotatable thereon, means to lock the table upon the base against angular movement, means to actuate said locking means and connected permanently thereto, and means geared to said actuating means operable thereby to clamp the table to the base against vertical movement therebetween.

13. A rotatable support comprising, in combination, a base, a holder rotatable thereon and means operable in one direction to clamp said holder to said base and in the opposite direction to release the holder from the base, said means upon further actuation in said releasing direction being adapted to raise the holder from the base and comprising a sleeve rigidly secured in the base and extending vertically therefrom into a bore in said holder, a bolt slidable axially but not rotatably in said sleeve, said bolt having a head thereon confined in the holder to a limited axial movement, a nut mounted in said base for rotational but against axial movement in screw threaded engagement with the lower end of said bolt, and a control device mounted on said base arranged for rotating the nut in opposite directions.

14. A rotatable support comprising, in combination, a base, a holder rotatable thereon, a bearing sleeve rigidly secured in said base and extending vertically therefrom into a bore in said holder, a bolt slidable axially but not rotatably in said bearing sleeve and having a head thereon confined in the holder to a limited axial movement, a nut rotatably mounted in said base in screw threaded engagement with the lower end of said bolt, and means to rotate said nut operable in one direction to clamp the holder to the base and in the opposite direction to raise the holder from the base.

15. A rotatable support comprising, in combination, a base, a holder rotatable thereon, a bolt and nut device for clamping the holder to the base, one element of which has gear teeth on the periphery thereof and is rotatably mounted in the base, and means for actuating said device comprising a rock shaft mounted in the base and having gear teeth thereon, and a rack slidably mounted in the base connecting said toothed members.

In testimony whereof, I have hereunto affixed my signature.

CHARLES B. DE VLIEG.